United States Patent
Albert et al.

(10) Patent No.: US 10,828,843 B2
(45) Date of Patent: Nov. 10, 2020

(54) SHEAR WEBS FOR WIND TURBINE ROTOR BLADES AND METHODS FOR MANUFACTURING SAME

(71) Applicant: General Electric Company, Schenectady, NY (US)

(72) Inventors: Bensely Albert, Greenville, SC (US); Amir Riahi, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 15/460,564

(22) Filed: Mar. 16, 2017

(65) Prior Publication Data
US 2018/0264749 A1 Sep. 20, 2018

(51) Int. Cl.
*F03D 1/06* (2006.01)
*B29C 65/56* (2006.01)
(Continued)

(52) U.S. Cl.
CPC ........ *B29C 65/565* (2013.01); *B29D 99/0028* (2013.01); *B33Y 10/00* (2014.12); *B33Y 80/00* (2014.12); *F03D 1/0675* (2013.01); *B29L 2031/085* (2013.01); *F05B 2230/23* (2013.01); *F05B 2230/31* (2013.01); *F05B 2240/221* (2013.01); *F05B 2280/4007* (2013.01); *F05B 2280/6003* (2013.01); *F05B 2280/6013* (2013.01); *Y02E 10/721* (2013.01); *Y02P 70/523* (2015.11)

(58) Field of Classification Search
CPC ......... Y10T 29/49336; Y10T 29/49337; Y10T 29/49339; Y10T 29/49321; Y10T 29/49316; F05B 2230/31; F05B 2230/23; F05B 2280/6031; F05B 2280/6003; F05B 2280/4007; B29D 99/0028; B33Y 80/00; Y02E 10/721
See application file for complete search history.

(56) References Cited

U.S. PATENT DOCUMENTS 7,470,114 B2 12/2008 Bonnet
7,811,063 B2 10/2010 Bonnet
(Continued)

FOREIGN PATENT DOCUMENTS

CN 203515969 U 4/2014
EP 2863052 A1 4/2015
(Continued)

OTHER PUBLICATIONS

NPL English Translation Guan CN 205716394 (Year: 2016).*
(Continued)

*Primary Examiner* — Jason L Vaughan
*Assistant Examiner* — Amanda Kreiling
(74) *Attorney, Agent, or Firm* — Dority & Manning, P.A.

(57) ABSTRACT

The present disclosure is directed to a method for manufacturing a rotor blade component, such as shear web, of a rotor blade of a wind turbine. The method includes forming, via 3-D printing, an internal lattice structure of the rotor blade component. More specifically, the internal lattice structure includes a plurality of open cells. In addition, the method includes covering at least a portion of the internal lattice structure with an outer skin layer to form the rotor blade component.

12 Claims, 9 Drawing Sheets

(51) Int. Cl.
  *B33Y 10/00* (2015.01)
  *B33Y 80/00* (2015.01)
  *B29D 99/00* (2010.01)
  *B29L 31/08* (2006.01)

(56) References Cited

U.S. PATENT DOCUMENTS

| | | | |
|---|---|---|---|
| 7,841,835 | B2 | 11/2010 | Bagepalli et al. |
| 7,857,595 | B2 | 12/2010 | Wambeke et al. |
| 7,866,951 | B2 | 1/2011 | Kavala |
| 7,895,745 | B2 | 3/2011 | Althoff et al. |
| 7,922,454 | B1 | 4/2011 | Riddell |
| 8,043,066 | B2 | 10/2011 | Sambamurty |
| 8,075,275 | B2 | 12/2011 | Althoff et al. |
| 8,075,278 | B2 | 12/2011 | Zuteck |
| 8,192,169 | B2 | 6/2012 | Piasecki |
| 8,235,671 | B2 | 8/2012 | Yarbrough |
| 8,257,048 | B2 | 9/2012 | Yarbrough |
| 8,262,362 | B2 | 9/2012 | Yarbrough |
| 8,393,871 | B2 | 3/2013 | Yarbrough |
| 8,409,381 | B2 | 4/2013 | Ramm et al. |
| 8,454,791 | B2 * | 6/2013 | Gau .................. B29D 99/0028 156/228 |
| 8,500,409 | B2 | 8/2013 | Baker et al. |
| 8,662,449 | B2 | 3/2014 | Shah et al. |
| 8,828,172 | B2 | 9/2014 | Overgaard |
| 8,859,088 | B2 * | 10/2014 | Broughton, Jr. .......... E04C 3/28 428/221 |
| 8,905,718 | B2 | 12/2014 | Hayden et al. |
| 9,458,823 | B2 | 10/2016 | Liu |
| 9,492,973 | B2 | 11/2016 | Datta et al. |
| 2010/0092300 | A1 * | 4/2010 | Jensen ................ F03D 1/0675 416/233 |
| 2010/0098549 | A1 | 4/2010 | Mironov |
| 2011/0008175 | A1 | 1/2011 | Gau |
| 2011/0052408 | A1 | 3/2011 | Zuteck |
| 2011/0171038 | A1 | 7/2011 | Esaki et al. |
| 2011/0176928 | A1 | 7/2011 | Jensen |
| 2011/0229333 | A1 | 9/2011 | Flach |
| 2012/0027612 | A1 * | 2/2012 | Yarbrough .............. F03D 1/065 416/226 |
| 2012/0027615 | A1 | 2/2012 | Irizarry-Rosado et al. |
| 2012/0051937 | A1 | 3/2012 | Grase et al. |
| 2013/0216388 | A1 | 8/2013 | Akhtar et al. |
| 2013/0219718 | A1 | 8/2013 | Busbey et al. |
| 2014/0064980 | A1 | 3/2014 | Griesel |
| 2014/0286780 | A1 | 9/2014 | Lemos et al. |
| 2015/0064014 | A1 | 3/2015 | Bakhuis et al. |
| 2015/0152838 | A1 | 6/2015 | Merzhaeuser et al. |
| 2015/0308402 | A1 | 10/2015 | Nielsen |
| 2015/0316023 | A1 | 11/2015 | Sandercock et al. |
| 2015/0316026 | A1 * | 11/2015 | Noronha .............. F03D 1/0675 416/226 |
| 2016/0279890 | A1 | 9/2016 | Jespersen et al. |
| 2016/0301299 | A1 | 10/2016 | Pan et al. |
| 2017/0021575 | A1 | 1/2017 | Hansen et al. |
| 2018/0264749 | A1 | 9/2018 | Albert et al. |

FOREIGN PATENT DOCUMENTS

| | | |
|---|---|---|
| IN | 201202927 P1 | 11/2013 |
| IN | 201209386 P1 | 7/2014 |
| KR | 20130022160 A | 3/2013 |
| KR | 20150002044 U | 5/2015 |
| KR | 10/1642066 B1 | 7/2016 |
| WO | WO2013060332 A1 | 5/2013 |
| WO | WO2015199313 A1 | 12/2015 |
| WO | WO 2016/209945 | 12/2016 |
| WO | WO 2017/092766 A1 | 6/2017 |
| WO | WO-2017092766 A1 * | 6/2017 |

OTHER PUBLICATIONS

Guan CN 205716394 Drawing (Year: 2016).*
KR 20140110951 English translation (Year: 2014).*
KR 20140110951 drawings (Year: 2014).*
Dong, et al., Shear response of carbon fiber composite octet-truss lattice structures, ScienceDirect Elsevier, Ltd, Composites: Part A, Nov. 14, 2015, vol. 81, pp. 182-192.
International Search Report, dated Apr. 10, 2019.

* cited by examiner

SHEAR WEBS FOR WIND TURBINE ROTOR BLADES AND METHODS FOR MANUFACTURING SAME

FIELD OF THE INVENTION

The present disclosure relates in general to wind turbine rotor blades, and more particularly to shear webs for wind turbine rotor blades and methods of manufacturing same.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves.

Such structural components are typically constructed of various materials, including but not limited to glass fiber laminate composites and/or carbon fiber laminate composites. More specifically, the shell of the rotor blade is generally built around the spar caps of the blade by stacking layers of fiber fabrics in a shell mold. The layers are then typically infused together with a resin material. Further, the shear web is typically constructed using a similar molding process and then mounted between the spar caps.

As rotor blades continue to increase in size, the spar caps and the shear web also increase in size and add weight to the overall rotor blade. Thus, the art is continually seeking new and improved structural components, such as shear webs, that provide the required strength and/or stiffness to the rotor blade while also minimizing the overall weight of the rotor blade and methods of manufacturing same.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for manufacturing a rotor blade component of a rotor blade of a wind turbine. The method includes forming an internal lattice structure of the rotor blade component. More specifically, the internal lattice structure includes a plurality of open cells. In addition, the method includes covering at least a portion of the internal lattice structure with an outer skin layer to form the rotor blade component.

In one embodiment, the method includes forming the internal lattice structure of the shear web via at least one of additive manufacturing, continuous liquid interface production, maypole braiding, or automated fiber placement.

In another embodiment, the outer skin layer may be constructed of a composite laminate material. As such, the method may include securing the outer skin layer to the internal lattice structure via fusion bonding. More specifically, in certain embodiments, fusion bonding may include frictional heating, electromagnetic heating, bulk heating, or one or more thermal techniques.

In further embodiments, the method may include securing at least one face plate to one or more ends of the internal lattice structure to the outer skin layer. More specifically, in such embodiments, the step of securing at least one face plate to the one or more ends of the internal lattice structure to the outer skin layer may include securing a first face plate at a first end of the internal lattice structure and securing a second face plate an opposing, second end of the internal lattice structure. Thus, the first and second face plates are configured to be secured to opposing spar caps of the rotor blade.

In additional embodiments, the method may include filling at least a portion of the lattice structure with a core material. For example, in particular embodiments, the core material may include foam, cork, composites, balsa wood, or any other suitable lightweight material.

In another embodiment, the internal lattice structure may include a plurality of lattice structure segments. In such embodiments, the method may further include joining the plurality of lattice structure segments together, e.g. via one or more interlocking components.

In particular embodiments, the internal lattice structure may be constructed of a thermoplastic material or a thermoset material. In addition, the method may include reinforcing the internal lattice structure with at least one fiber material, including but not limited to glass fibers, nanofibers, carbon fibers, metal fibers, wood fibers, bamboo fibers, polymer fibers, ceramic fibers, or similar. In addition, the fiber material may include short fibers, long fibers, or continuous fibers.

In certain embodiments, the rotor blade component may include a shear web, a blade tip segment, a spar cap, or any other component of the rotor blade.

In another aspect, the present disclosure is directed to a method for manufacturing a shear web of a rotor blade of a wind turbine. The method includes printing, via computer numeric control (CNC), an internal lattice structure of a shear web directly onto one of an inner surface of a blade shell of the rotor blade or one or more spar caps of the rotor blade. Further, the internal lattice structure includes a plurality of open cells. In addition, the internal lattice structure of the shear web bonds to the inner surface of the blade shell or one of the spar caps during printing. It should also be understood that the method may further include any of the additional steps and/or features as described herein.

In yet another aspect, the present disclosure is directed to a method for a method for manufacturing a rotor blade of a wind turbine. The method includes forming an internal lattice structure of a shear web. More specifically, the internal lattice structure includes a plurality of open cells. The method further includes securing the internal lattice structure between a pressure side shell and suction side shell of the rotor blade.

In one embodiment, the method further includes forming the internal lattice structure of the shear web directly onto the inner surface of the blade shell via at least one of additive manufacturing, continuous liquid interface production, maypole braiding, or automated fiber placement.

In another embodiment, the method may include covering at least a portion of the internal lattice structure with an outer skin layer to form the shear web.

In further embodiments, the method may include securing at least one face plate to one or more ends of the internal lattice structure to the outer skin layer. In additional embodiments, the method may include placing a step feature on the inner surface of the blade shell and securing the at least one face plate to the step feature.

In yet another embodiment, the method may include forming a plurality of internal lattice structures so as to form a plurality of shear webs and securing each of the plurality of internal lattice structures to the inner surfaces of the blade shell of the rotor blade. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing lightweight rotor blade components, such as shear webs, having a lattice structure using automated deposition of materials via technologies such as 3-D printing, additive manufacturing, automated fiber deposition, as well as other techniques that utilize CNC control and multiple degrees of freedom to deposit materials. Thus, the methods described herein provide many advantages not present in the prior art. For example, the methods of the present disclosure provide lightweight rotor blade components that can be easily printed faster than conventional manufacturing methods. In addition, the methods of the present disclosure provide a high level of automation, faster throughput, and reduced costs.

Figure 1:
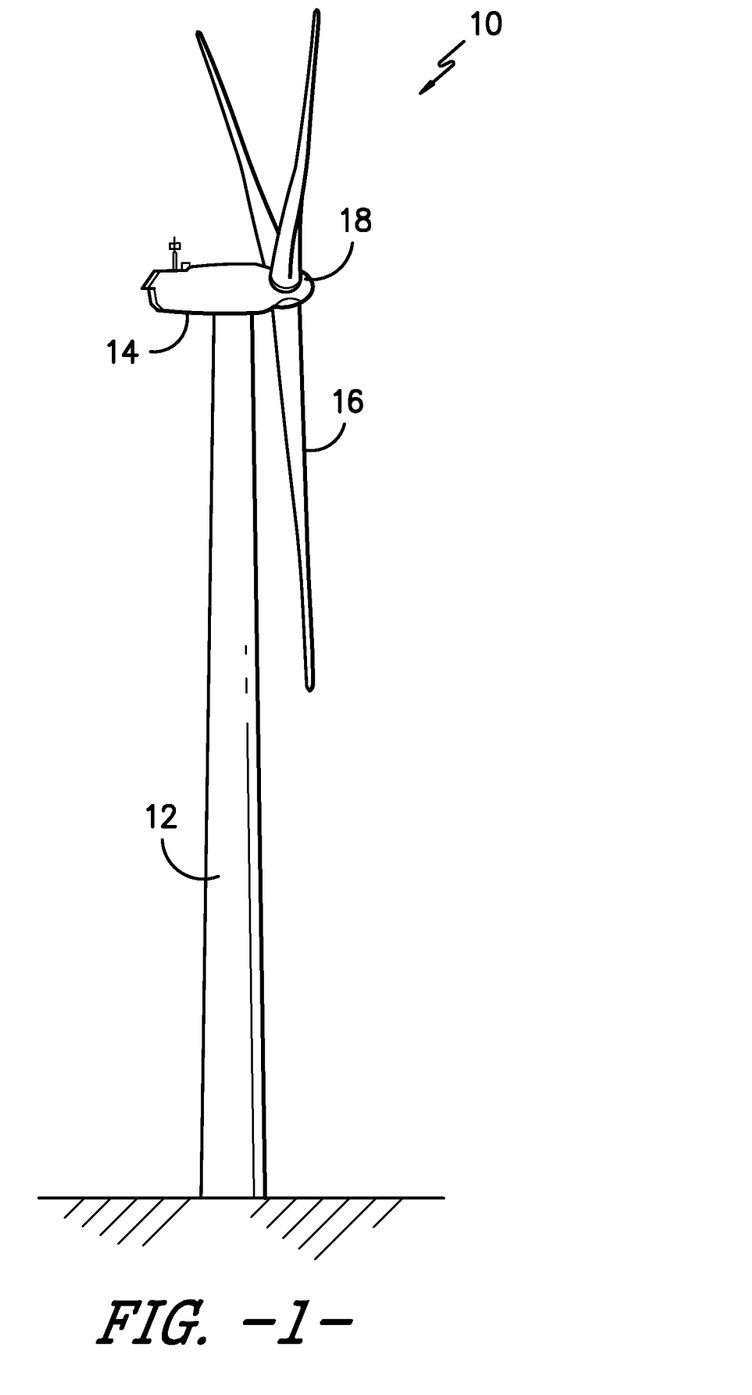
FIG. 1 illustrates a perspective view of one embodiment of a wind turbine according to the present disclosure.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 2:
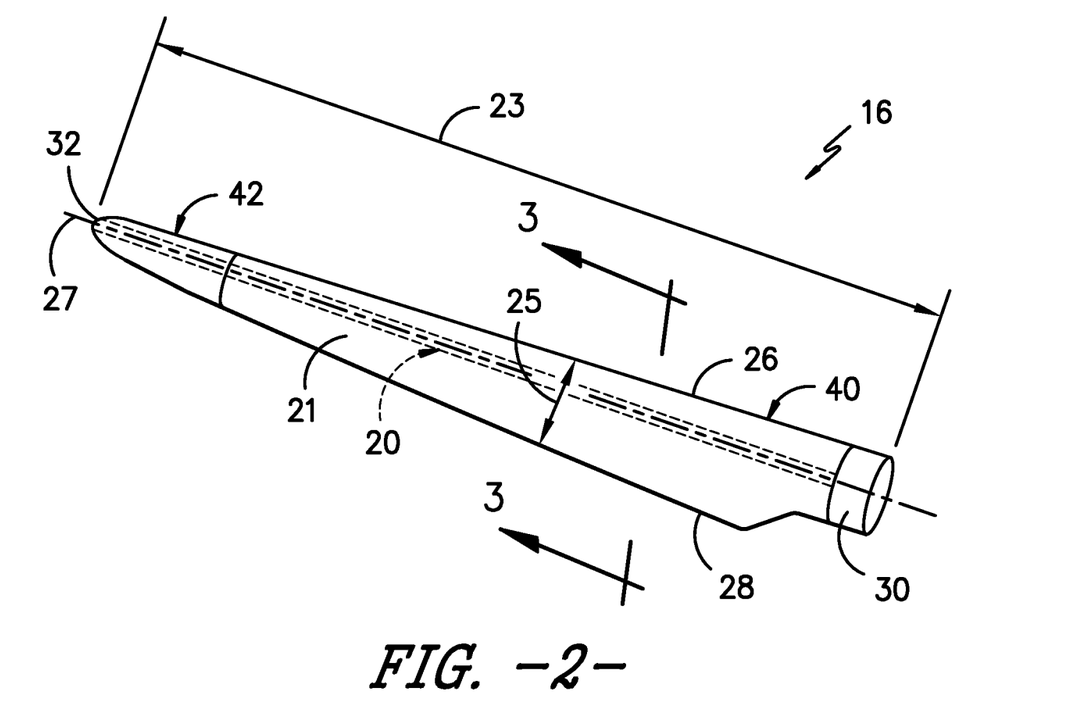
FIG. 2 illustrates a perspective view of one of the rotor blades of FIG. 1.
Figure 3:
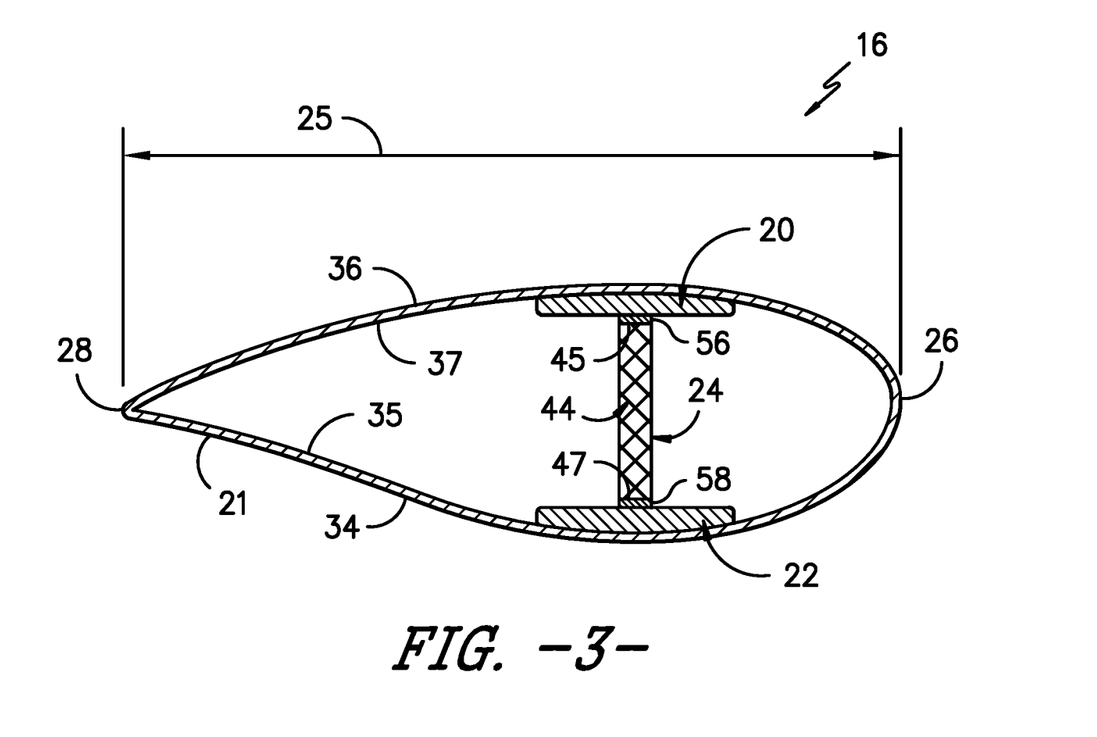
FIG. 3 illustrates a cross-sectional view of the rotor blade of FIG. 2 along line 3-3.

Referring to FIGS. 2 and 3, one of the rotor blades 16 of FIG. 1 is illustrated according to the present disclosure. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components and/or segments. For example, in one embodiment, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. In addition, the body shell 21 may be formed from a plurality of blade segments aligned in a span-wise end-to-end configuration. For example, as shown in FIG. 2, the body shell 21 includes a blade root segment 40 and blade tip segment 42. In such embodiments, the blade tip segment 42 may be changed according to a desired aerodynamic characteristics of the rotor blade 16.

Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally span-wise direction (a direction parallel to the span 23 of the rotor blade 16) during operation of a wind turbine 10. Similarly, the spar caps 20, 22 may also be designed to withstand the span-wise compression occurring during operation of the wind turbine 10.

Referring now to FIGS. 3-12, the present disclosure is directed to methods for manufacturing a rotor blade component of a rotor blade of a wind turbine. In certain embodiments, the rotor blade component(s) as described herein may include a shear web, a blade tip segment, or a spar cap, though it should be understood that the methods of the present disclosure may be further applied to any other suitable rotor blade components. More specifically, as shown in the illustrated embodiment, the present disclosure is directed to methods for manufacturing the shear web 24 of the rotor blade 16 of the wind turbine 10. It should be understood, however, that the illustrations are for illustrative purposes only and are not meant to limit the methods of the present disclosure to a shear web and manufacturing methods thereof.

Figure 4:
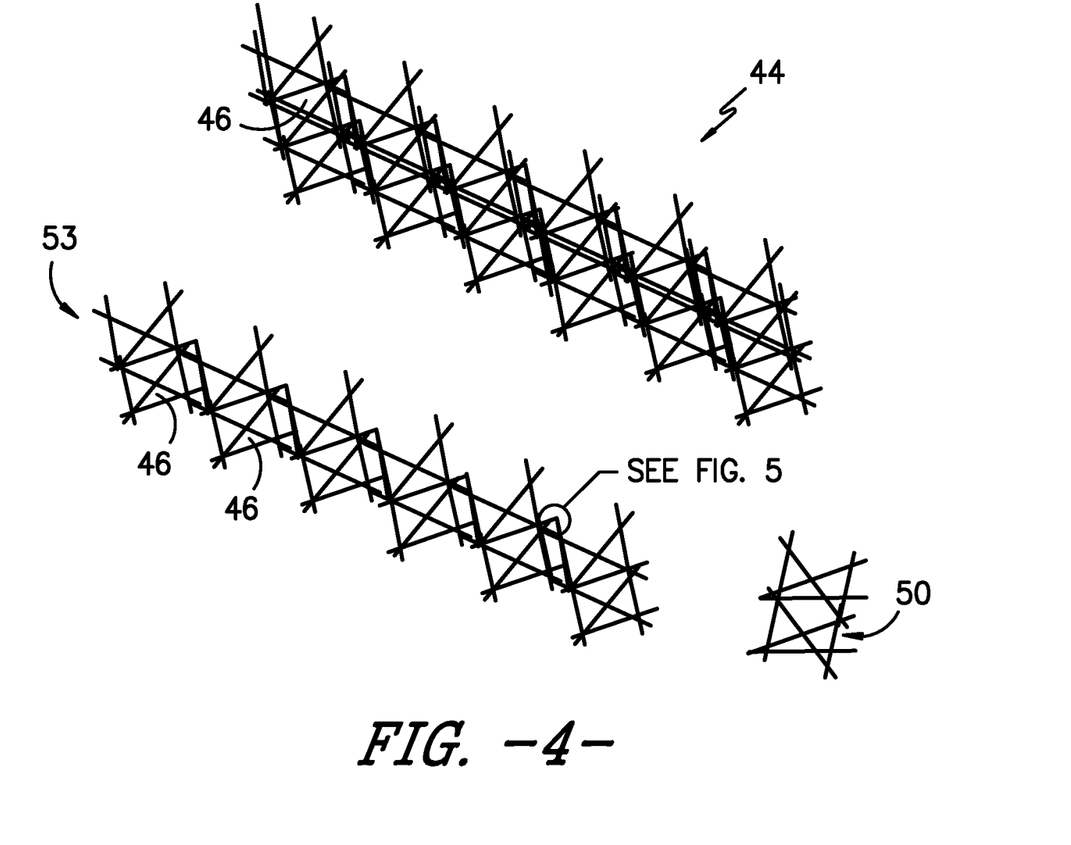
FIG. 4 illustrates a perspective view of one embodiment of an internal lattice structure of a shear web according to the present disclosure, particularly illustrating a plurality of lattice structure segments joined together to form the internal lattice structure.

Referring particularly to FIG. 4, one embodiment of the method includes forming an internal lattice structure 44 of the shear web 24. For example, in one embodiment, the method includes forming the internal lattice structure 44 of the shear web 24 via at least one of additive manufacturing, continuous liquid interface production, maypole braiding, or automated fiber placement. Additive manufacturing, or 3D printing, as used herein, is generally understood to encompass processes used to synthesize three-dimensional objects in which successive layers of material are formed under computer control (e.g. via computer numeric control (CNC)) to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes.

Figure 5:
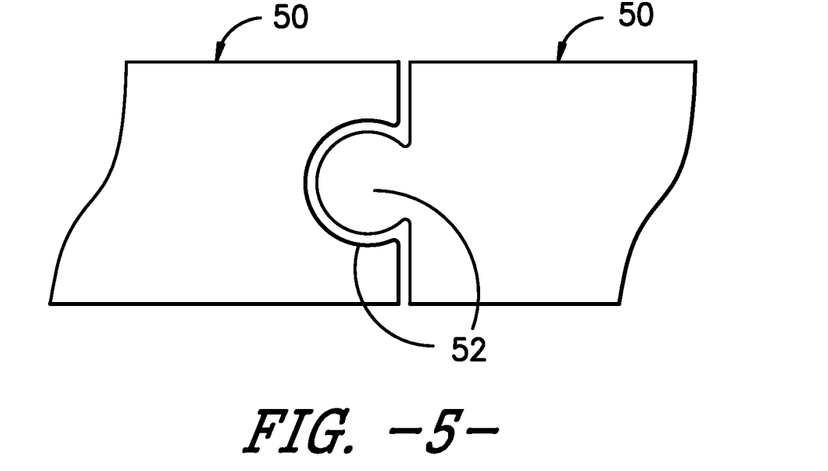
FIG. 5 illustrates a cross-sectional view of one embodiment of joined interlocking components of adjacent lattice structure segments according to the present disclosure.

As such, the internal lattice structure 44 may include a plurality of open cells 46, thereby providing a lightweight shear web 24 for the rotor blade 16. Further, as shown in FIGS. 4 and 5, the internal lattice structure 44 may include a plurality of lattice structure segments 50 joined together to form the overall structure 44. In such embodiments, the method may include forming or printing the plurality of lattice structure segments 50 and joining the plurality of lattice structure segments 50 together via one or more interlocking components 52. In addition, as shown in FIG. 5, the interlocking components 52 may have a dovetail configuration. In alternative embodiments, the interlocking components 52 may include a snap fit. Further, as shown in FIG. 4, multiple rows 53 of lattice structure segments 50 may be joined together and then the multiple rows 53 may be subsequently joined together to form the overall structure 44. Alternatively, the internal lattice structure 44 may be printed as a single structure.

In addition, in certain embodiments, the internal lattice structure 44 may be constructed of a thermoplastic material or a thermoset material. The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, the method may include reinforcing the internal lattice structure 44 with at least one fiber material, including but not limited to glass fibers, nanofibers, carbon fibers, metal fibers, wood fibers, bamboo fibers, polymer fibers, ceramic fibers, or similar or combinations thereof. Further, the fiber material may include short fibers, long fibers, or continuous fibers. Moreover, the direction of the fibers may include multi-axial, unidirectional, biaxial, tri-axial, or any other another suitable direction and/or combinations thereof.

Figure 6:
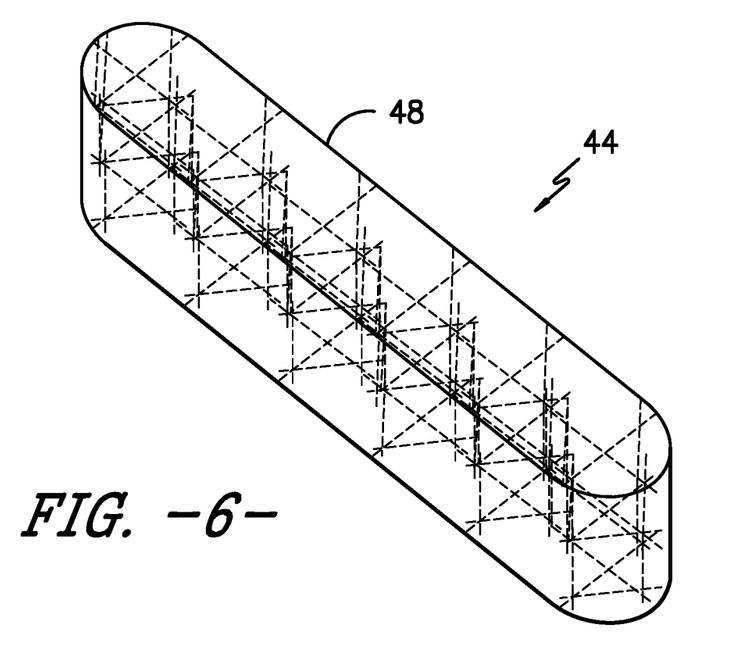
FIG. 6 illustrates a perspective view of one embodiment of an internal lattice structure of a shear web covered by an outer skin layer according to the present disclosure, particularly illustrating the internal lattice structure having a plurality of open cells.
Figure 7:
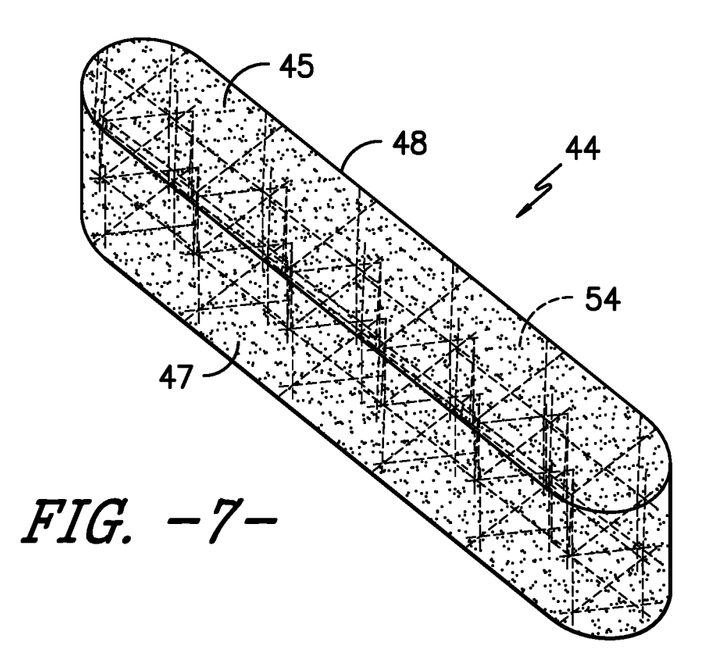
FIG. 7 illustrates a perspective view of one embodiment of an internal lattice structure of a shear web covered by an outer skin layer according to the present disclosure, particularly illustrating the internal lattice structure filled with a core material.

In further embodiments, as shown particularly in FIG. 7, the method may include filling at least a portion of the internal lattice structure 44 with a core material 54. For example, in particular embodiments, the core material 54 described herein may be constructed of any suitable materials, including but not limited to low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), polyethylene terephthalate (PET) foams, other foam rubbers/resin-based foams and various other open cell and closed cell foams. Alternatively, as shown in FIG. 6, the internal lattice structure 44 may not include a core material 54.

In addition, as shown in FIGS. 6 and 7, the method may also include covering at least a portion of the internal lattice structure 44 (with or without the core material 54) with an outer skin layer 48 to form the shear web 24. More specifically, in certain embodiments, the outer skin layer 48 may be constructed of a composite laminate material, including, for example, a thermoset material and/or a thermoplastic material as described herein. As such, the method may include securing the outer skin layer 48 to the internal lattice structure 44 via fusion bonding. More specifically, in certain embodiments, fusion bonding may include frictional heating, electromagnetic heating, bulk heating, or one or more thermal techniques. Frictional heating, for example, may include spin welding, vibration welding, and/or ultrasonic welding. Electromagnetic heating, for example, may include induction welding, microwave welding, dielectric welding, and/or resistance welding. Bulk heating, for example, may include hot melt adhesives and/or dual-resin bonding. Additional thermal techniques, for example, may include hot plate welding, hot gas welding, radiant welding, infrared welding, and/or laser welding.

Figure 8:
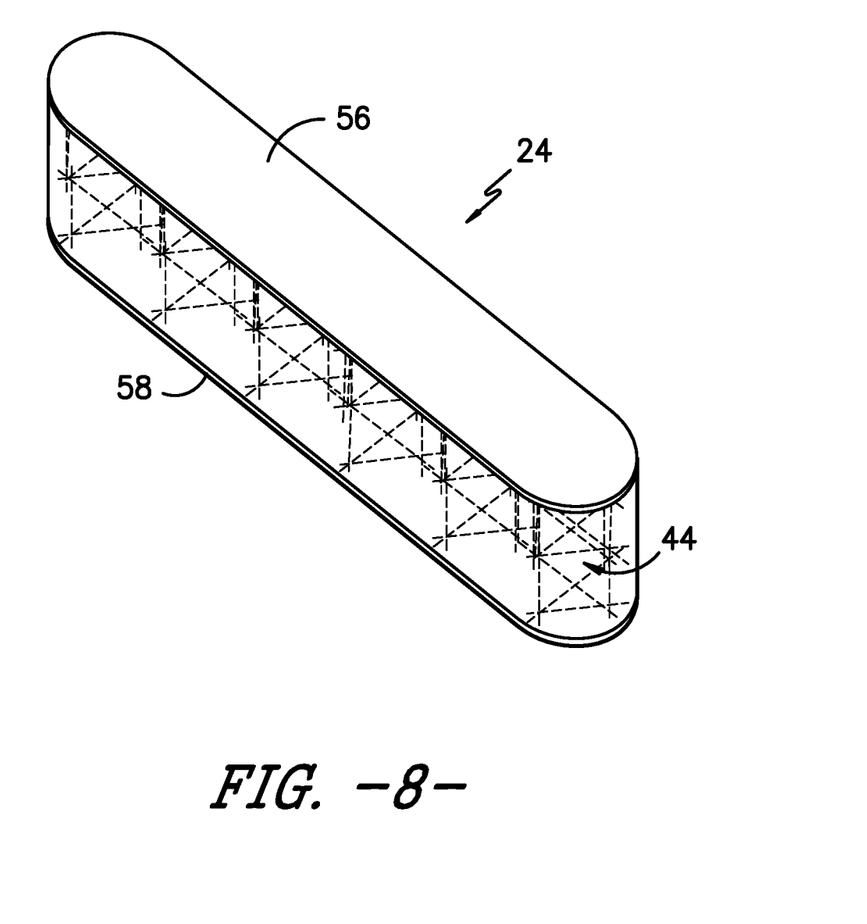
FIG. 8 illustrates a perspective view of one embodiment of an internal lattice structure of a shear web covered by an outer skin layer according to the present disclosure, particularly illustrating face plates at opposing ends of the internal lattice structure.
Figure 9:
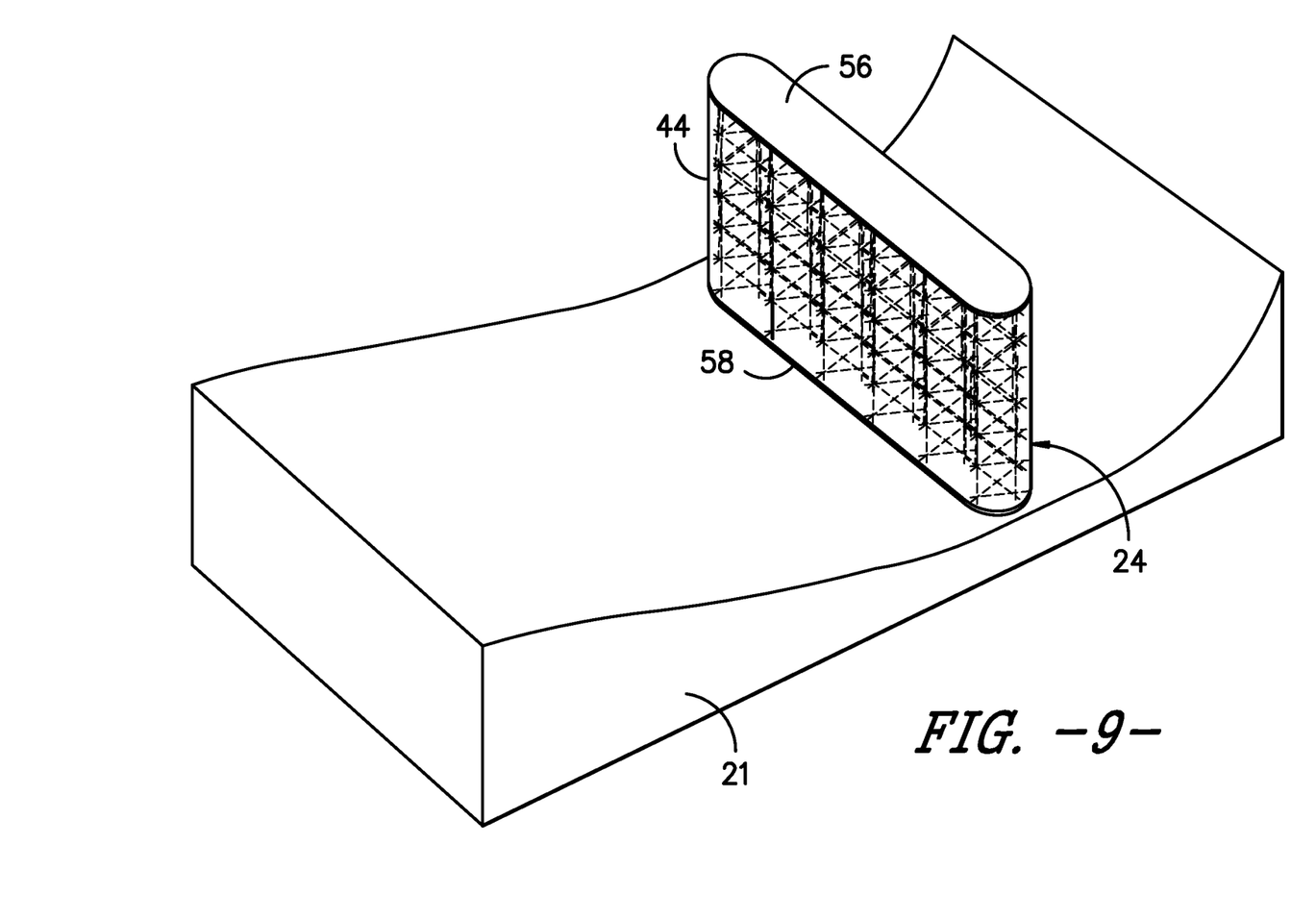
FIG. 9 illustrates a partial, perspective view of one embodiment of a shear web comprising an internal lattice structure according to the present disclosure secured to an inner surface of a body shell of a rotor blade.

Referring now to FIGS. 3 and 8, the method may include securing at least one face plate 56, 58 to one or more ends 45, 47 of the internal lattice structure 44 to the outer skin layer 48. More specifically, in such embodiments, the method may include securing a first face plate 56 at a first end 45 of the internal lattice structure 44 and securing a second face plate 58 an opposing, second end of the internal lattice structure 44. In particular embodiments, the face plates 56, 58 may be secured to the ends 45, 47 of the lattice structure 44 via any suitable attachment methods, including but not limited to adhesives, mechanical fasteners, and/or welding (e.g. thermoplastic welding).

Thus, as shown in FIGS. 3 and 9-12, the first and second face plates 56, 58 of the shear web 24 may be secured to the opposing spar caps 20, 22 or the body shell 21 of the rotor blade 16. For example, in certain embodiments, the face plates 56, 58 may be secured to the opposing spar caps 20, 22 22 or the body shell 21 of the rotor blade 16 via any suitable attachment methods, including but not limited to adhesives, mechanical fasteners, and/or welding (e.g. thermoplastic welding). In alternative embodiments, the method may include printing the internal lattice structure 44 of the shear web 24 directly onto an inner surface 35, 37 of the blade shell 21 of the rotor blade 16 and/or directly onto one of the spar caps 20, 22. In such embodiments, the internal lattice structure 44 bonds to the inner surfaces 35, 37 and/or the spar caps 20, 22 during the printing process.

Figure 10:
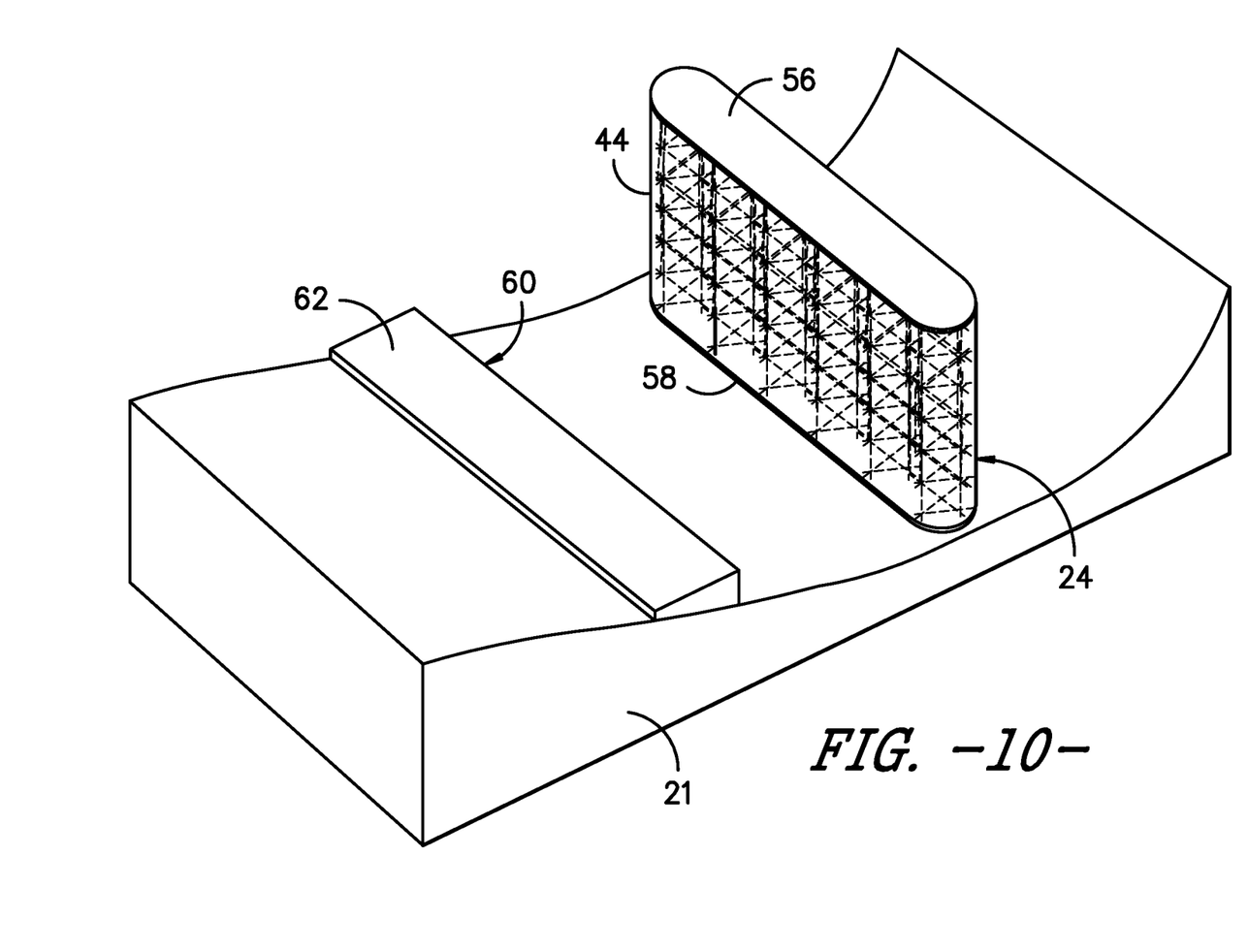
FIG. 10 illustrates a partial, perspective view of one embodiment of a shear web comprising an internal lattice structure according to the present disclosure secured to an inner surface of a body shell of a rotor blade as well as a step feature secured to the inner surface of the body shell.
Figure 11:
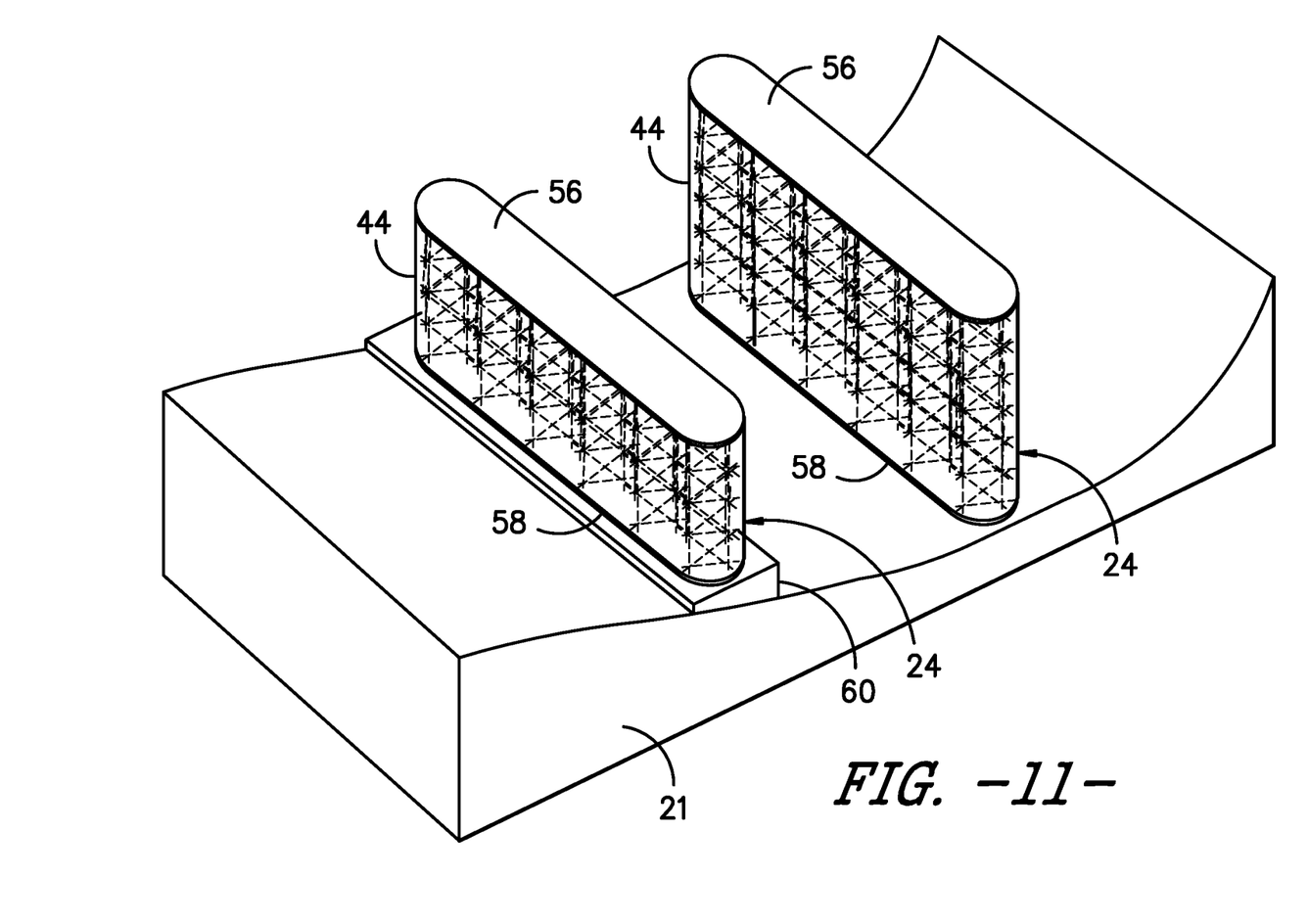
FIG. 11 illustrates a partial, perspective view of one embodiment of a plurality of shear webs comprising an internal lattice structure according to the present disclosure secured to an inner surface of a body shell of a rotor blade.
Figure 12:
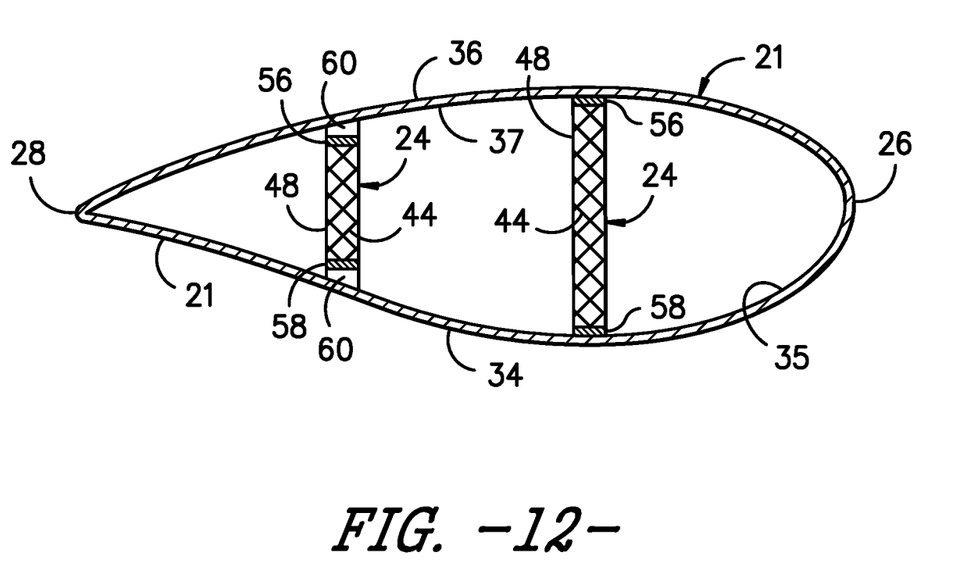
FIG. 12 illustrates a perspective view of one embodiment of a plurality of shear webs comprising an internal lattice structure according to the present disclosure secured to an inner surface of a body shell of a rotor blade.

Referring particularly to FIGS. 10-12, in further embodiments, the method may include placing a step feature 60 on the inner surface 35 of the blade shell 21 and securing one of the face plates 56, 58 of the shear web 24 to the step feature 60. More specifically, as shown, the step feature 60 may have a generally triangular cross-section with a flat upper surface 62 so as to accommodate the curvature of the rotor blade 16. Thus, as shown, one of the end plates 56, 58 of the shear web 24 is configured to sit atop the flat upper surface 62 of the step feature 60 and can easily be secured thereto, e.g. via adhesives, mechanical fasteners, and/or welding (e.g. thermoplastic welding). In addition, as shown, the end plates 56, 58 may also be directly secured to the inner surfaces 35, 37 of the body shell 21 of the rotor blade 16 rather than using the step feature 60. Thus, it should be understood that the step feature(s) 62 described herein may be constructed of any suitable materials, such as e.g. a thermoplastic or thermoset material, and may be formed using any suitable manufacturing methods such as those methods described herein.

In yet another embodiment, as shown in FIGS. 11 and 12, the method may also include forming a plurality of internal lattice structures 44 so as to form a plurality of shear webs 24 and securing each of the plurality of internal lattice structures 44 to the inner surfaces 35, 37 of the blade shell 21 and/or the spar caps 20, 22 of the rotor blade 16. As such, any number of shear webs 24 may be manufactured and installed into the rotor blade 16 to achieve a desired strength and/or stiffness of the blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade of a wind turbine, the method comprising:

forming an internal lattice structure, the internal lattice structure comprising a plurality of open cells defined by a plurality of angled cross members, wherein the plurality of angled cross members form a plurality of lattice junctions at points of intersection between the angled cross members, the internal lattice structure being constructed of at least one of a thermoplastic material or a thermoset material;

completely covering the internal lattice structure with an outer skin layer such that the internal lattice structure is completely encased within the outer skin layer to form a rotor blade component, the rotor blade component comprising at least one of a shear web or a spar cap of the rotor blade; and securing the rotor blade component between pressure and suction side blade shells to form the rotor blade such that the outer skin layer extends between the internal lattice structure and each of the pressure and suction side blade shells of the rotor blade.

2. The method of claim 1, further comprising forming the internal lattice structure of the rotor blade component via at least one of additive manufacturing, continuous liquid interface production, maypole braiding, or automated fiber placement.

3. The method of claim 1, wherein the outer skin layer is constructed of a composite laminate material.

4. The method of claim 1, further comprising securing the outer skin layer to the internal lattice structure via fusion bonding, wherein fusion bonding comprises at least one of frictional heating, electromagnetic heating, bulk heating, or one or more thermal techniques.

5. The method of claim 1, further comprising securing at least one face plate to one or more ends of the internal lattice structure to the outer skin layer.

6. The method of claim 5, wherein securing the at least one face plate to the one or more ends of the internal lattice structure to the outer skin layer further comprises securing a first face plate at a first end of the internal lattice structure and securing a second face plate an opposing, second end of the internal lattice structure, the first and second face plates configured for securing to opposing spar caps of the rotor blade.

7. The method of claim 5, further comprising placing a step feature on an inner surface of at least one of the pressure side or suction side blade shells and securing the rotor blade component to the step feature.

8. The method of claim 1, further comprising filling at least a portion of the internal lattice structure with a core material, wherein the core material comprises at least one of foam, cork, composites, or balsa wood.

9. The method of claim 1, wherein the internal lattice structure comprises a plurality of lattice structure segments.

10. The method of claim 9, further comprising joining the plurality of lattice structure segments together via one or more interlocking components.

11. The method of claim 1, further comprising reinforcing the internal lattice structure with at least one fiber material, the fiber material comprising at least one of glass fibers, nanofibers, carbon fibers, metal fibers, wood fibers, bamboo fibers, polymer fibers, or ceramic fibers.

12. The method of claim 11, wherein the fiber material comprises at least one of short fibers, long fibers, or continuous fibers.

* * * * *